OR 4,048,633 32

X1083D X1121W

X1106D X1112Y

United States Patent [19]

Sano

[11] 4,048,633

[45] Sept. 13, 1977

[54] LIQUID CRYSTAL DRIVING SYSTEM

[75] Inventor: Shunichi Sano, Zama, Japan

[73] Assignee: Tokyo Shibaura Electric Co., Ltd., Kawasaki, Japan

[21] Appl. No.: 557,883

[22] Filed: Mar. 12, 1975

[30] Foreign Application Priority Data

| | | |
|---|---|---|
| Mar. 13, 1974 | Japan | 49-28104 |
| Mar. 13, 1974 | Japan | 49-28105 |
| Mar. 13, 1974 | Japan | 49-28106 |
| Mar. 13, 1974 | Japan | 49-28107 |
| June 19, 1974 | Japan | 49-69113 |

[51] Int. Cl.[2] ............ G06F 3/14

[52] U.S. Cl. ............ 340/324 M; 340/336; 350/160 LC

[58] Field of Search ............ 340/324 R, 336; 350/160 LC

[56] References Cited

U.S. PATENT DOCUMENTS

| | | | |
|---|---|---|---|
| 3,652,148 | 3/1972 | Wysocki et al. | 350/160 LC |
| 3,891,307 | 6/1975 | Tsukamoto et al. | 340/324 R |
| 3,911,421 | 10/1975 | Alt et al. | 340/324 M |

*Primary Examiner*—Marshall M. Curtis

*Attorney, Agent, or Firm*—Cushman, Darby & Cushman

[57] ABSTRACT

Disclosed is a system for driving a liquid crystal provided between electrodes disposed within a transparent receptacle in a manner spaced from each other. In order to drive the liquid crystal the electrodes are applied with a square-shaped pulse voltage in which the absolute value of the ratio of the third harmonics wave component amplitude to the fundamental wave component amplitude is below $\frac{1}{3}$.

6 Claims, 26 Drawing Figures

LIQUID CRYSTAL DRIVING SYSTEM

BACKGROUND OF THE INVENTION

This invention relates to a liquid crystal driving system.

Conventionally, the liquid crystal device wherein electrodes are disposed on the inner wall surfaces of a transparent receptacle such as a transparent glass-made receptacle; and a liquid crystal, for example, a nematic liquid crystal is provided between the electrodes is driven by applying thereto a square wave pulse voltage readily obtained using, for example, an oscillator having the digital integrated circuit construction.

That is, upon applying a voltage to the liquid crystal, it is brought to a dynamic scattering state. When a light incides into the resulting liquid crystal, the incident light is subjected to scattering, so that this liquid crystal looks whitish to the eyes.

However, if, in case the liquid crystal is brought to a dynamic scattering state by applying a square wave pulse voltage to the liquid crystal, the ambient temperature of the liquid crystal is decreased, or the repetitive frequency of the square wave pulse voltage is increased, the liquid crystal will cease to respond to the applied voltage, namely will cease to present a dynamic scattering state. This is a drawback accompanying the prior art liquid crystal device.

SUMMARY OF THE INVENTION

This invention has been achieved in view of the above mentioned drawback, and is intended to provide a liquid crystal driving system which enables the liquid crystal to be driven up to a higher ambient temperature and yet enables the repetitive frequency of a square-shaped pulse capable of driving the liquid crystal to be more raised, through driving the liquid crystal by applying thereto a square-shaped pulse voltage in which the absolute value of the ratio of the third harmonics wave component amplitude to the fundamental wave component amplitude is below $\frac{1}{3}$.

Here in this specification, the square-shaped pulse voltage in which the absolute value of the ratio of the third harmonics wave component amplitude to the fundamental wave component amplitude is below $\frac{1}{3}$ is defined to mean a pulse voltage which consists of a combination of square wave pulse voltages and whose waveform fluctuates stepwise until a peak voltage level is reached, or the square shapes of whose waveform are somewhat deformed or made dull.

The characterizing feature of the invention resides in that the voltage being applied between the electrodes disposed mutually spaced with the liquid crystal interposed therebetween is a square-shaped pulse voltage in which the absolute value of the ratio $b3/b1$ where $b3$ represents the amplitude of the third harmonics wave component and $b1$ the amplitude of the fundamental wave component is below $\frac{1}{3}$.

PREFERRED EMBODIMENT OF THE INVENTION

There will now be described an embodiment of the invention by reference to the accompanying drawings. A liquid crystal device may be one having a known construction. To take an example, a pair of electrodes are disposed opposed to each other between the mutually opposed inner wall surfaces of an airtight receptacle made of transparent material such as glass and having a size of, for example 50 mm × 50 mm, and a liquid crystal layer 20 μm in thickness which consists of nematic liquid crystal, for example, a mixed liquid crystal composed of MBBA (P-methoxy benzylidene-P'-n-butyl aniline) and EBBA (P-ethoxy benzylidene-P'-n-butyl aniline) is provided between said pair of electrodes to obtain a liquid crystal device.

Figure 1:
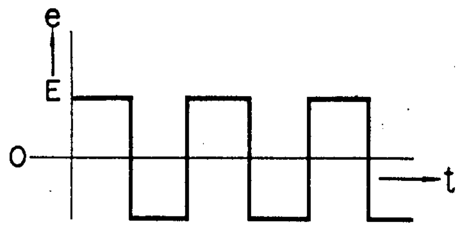
FIG. 1 is a prior art voltage waveform for being applied to a liquid crystal to drive the same.

Conventionally, the liquid crystal is generally driven by applying across said electrodes such a square wave pulse voltage as illustrated, for example, in FIG. 1 and thereby applying this voltage to the liquid crystal.

Generally, the AC voltage $e(t)$ whose cyclical period T is expressed by $2\pi/W$ and which contains no DC component is expanded into a Fourier series as below.

$$e(t) = \sum_{m=1}^{\infty} bm \sin m\,\omega t$$

where $$\omega = \frac{2\pi}{T};$$

$m$ is an integer; and $bm$ represents the amplitude of the $m$ th harmonics wave. Accordingly, the square wave pulse voltage illustrated in FIG. 1 is expanded into the following Fourier series.

$$e(t) = \frac{4E}{\pi}\left\{\sin \omega t + \frac{1}{3}\sin 3\,\omega t + \frac{1}{5}\sin 5\,\omega t + \ldots\right\}$$

As apparent from the above equation, such a square wave pulse voltage as illustrated in FIG. 1 contains many harmonics wave components as well as the fundamental wave component whose frequency $$f \text{ is } \frac{\omega}{2\pi}.$$

For example, the third harmonics wave component has an amplitude equal to $\frac{1}{3}$ of that of the fundamental wave component. If, in case liquid crystal driving is effected by applying such a square wave pulse voltage as illustrated in FIG. 1 to the liquid crystal, its repetitive frequency is raised up to a level of more than 800 Hz as seen from FIG. 2, or the ambient temperature of the liquid crystal is reduced below 5° C as seen from FIG. 3, the liquid crystal will cease to present a dynamic scattering state.

Figure 2:
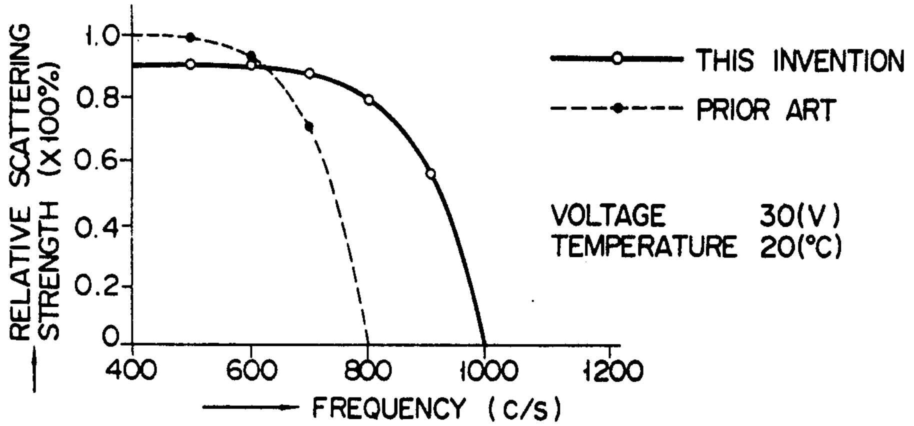
FIG. 2 is a curve diagram illustrating the light scattering strength characteristic of the liquid crystal relative to the frequency of a voltage applied.
Figure 5:
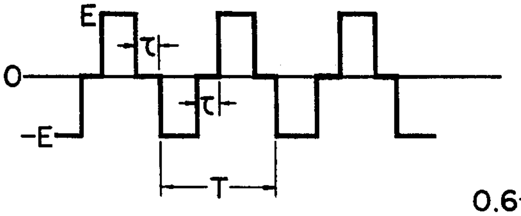
FIG. 5 is the waveform of a square-shaped pulse voltage used to embody this invention.

In FIG. 2, the curve indicated by a dotted line represents the characteristic of the liquid crystal in the case where such a square wave pulse voltage as illustrated in FIG. 1 is applied thereto, while the curve indicated by a solid line represents the characteristic of the liquid crystal in the case where there is applied thereto a voltage bearing a ratio $$\left|\frac{b3}{b1}\right|$$

of not more than $\frac{1}{3}$, for example, the square-shaped pulse voltage illustrated in FIG. 5 containing no third harmonics wave component ($b3$), the $b3$ and $b1$ representing the third harmonics wave component amplitude and the fundamental wave component amplitude, respectively.

As clear from FIG. 2, where the square-shaped pulse voltage containing no third harmonics wave component is applied to the liquid crystal, the liquid crystal can be driven into a dynamic scattering state until a higher repetitive frequency level is reached, namely, the repetitive frequency of a liquid crystal driving pulse can be more increased in level.

In the liquid crystal characteristic illustrated in FIG. 2, the repetitive frequency in case of this invention is increased by 200 Hz from that in case of prior art. This present characteristic is one which has been obtained under the condition in which the ambient temperature is 20° C and the square wave pulse voltage is 30 volt.

Figure 3:
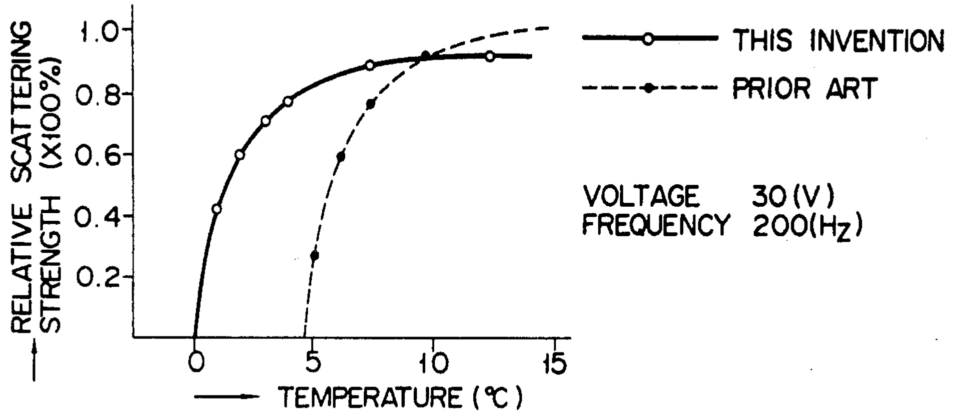
FIG. 3 is a curve diagram illustrating the light scattering strength characteristic of the liquid crystal relative to the ambient temperature thereof.

Let's consider now the dynamic scattering strength variation of the liquid crystal relative to temperature variation by reference to FIG. 3.

In FIG. 3, the curve indicated by a dotted line represents the characteristic obtained where the liquid crystal is driven by applying thereto such a square wave pulse voltage as illustrated in FIG. 1, while the curve indicated by a solid line represents the characteristic obtained where the liquid crystal is driven by applying thereto a voltage bearing the ratio $$\left|\frac{b3}{b1}\right|$$

of not more than $\frac{1}{3}$, for example, the square-shaped pulse voltage illustrated in FIG. 5 having no third harmonics wave component $b3$. It is seen from FIG. 3 that in the latter case the liquid crystal operates up to a lower temperature, i.e., up to a temperature of nearly 0° C, than in the former case. The characteristic in said latter case is one which has been obtained under the condition in which the square-shaped pulse voltage is 30 volt and the repetitive frequency is 200 Hz.

Figure 4:
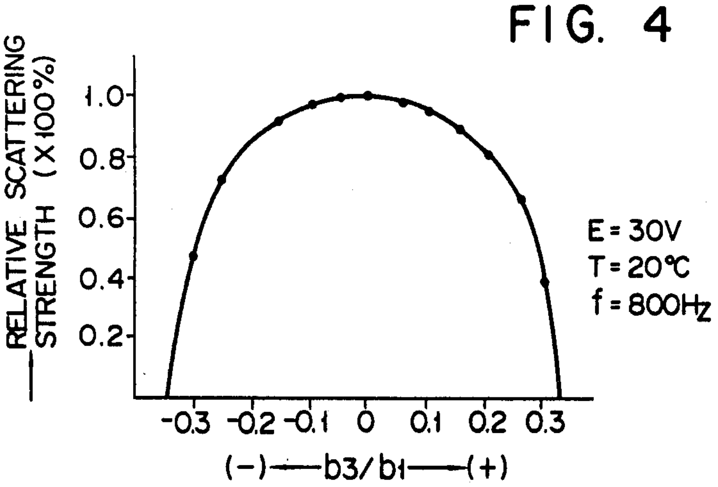
FIG. 4 is a curve diagram illustrating the light scattering strength characteristic of the liquid crystal relative to the ratio $b3/b1$ where $b3$ represents the third harmonics wave component amplitude and $b1$ the fundamental wave component amplitude of the applied voltage.

Further, concerning the light scattering strength where the liquid crystal is driven by the square-shaped pulse it has turned out that, as illustrated in FIG. 4, the light scattering strength is maximum when the $b3/b1$ is 0, namely when the third harmonics wave component is non-existent, while the light scattering strength is rapidly decreased as the $$\left|\frac{b3}{b1}\right|$$

approaches to $\frac{1}{3}$. The characteristic curve of FIG. 4 is one which has been obtained under the condition in which the ambient temperature is 20° C, the square-shaped pulse voltage is 30 volt, and the repetitive frequency of the square shaped pulse voltage is 800 Hz. It is to be noted here that though in the preceding embodiment a nematic liquid crystal was employed as the liquid crystal, the invention permits the use of cholesteric or smectic liquid crystal. From the foregoing, the present inventor has found that the liquid crystal is operable up to a lower temperature as well as up to a higher repetitive frequency by setting the ratio $$\left|\frac{b3}{b1}\right|$$

at a value of less than $\frac{1}{3}$, said ratio $$\left|\frac{b3}{b1}\right|$$

being the one of the third harmonics wave component amplitude *b3* to the fundamental wave component amplitude *b1* of the square-shaped pulse voltage being applied to the liquid crystal. As above described, where liquid crystal driving is performed by applying to the liquid crystal a square-shaped pulse voltage in which the ratio $$\left|\frac{b3}{b1}\right|$$

is reduced below $\frac{1}{3}$, the operating range in which the liquid crystal is operable with respect to the ambient temperature and the repetitive frequency of the applied voltage is widened.

Figure 6:
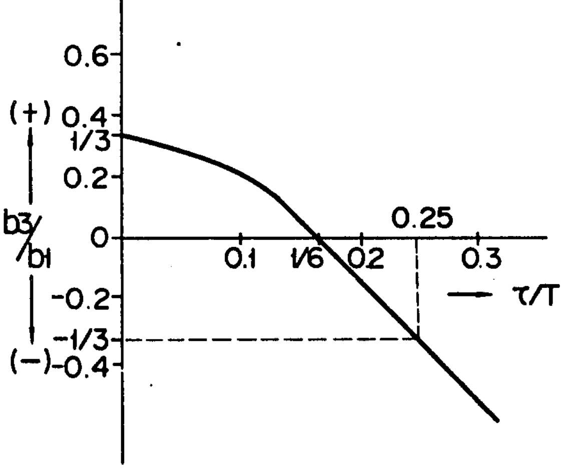
FIG. 6 is a characteristic curve diagram illustrating the relation between the ratio $b3/b1$ and the ratio $\tau/T$ of the waveform illustrated in FIG. 5 where T and $\tau$ represent the cyclical period and the zero potential period, respectively, of this waveform.

As the square-shaped pulse voltage bearing the ratio $$\left|\frac{b3}{b1}\right|$$

of less than $\frac{1}{3}$ there can be used, for example, a pulse voltage having a positive pulse and a negative pulse which alternately appear with the lapse of time and yet having a zero potential period therebetween as illustrated in FIG. 5. As later described, however, in the case of such a square-shaped pulse having a zero level period $\tau$ as illustrated in FIG. 5, the condition of the ratio $$\left|\frac{b3}{b1}\right|$$

being less than $\frac{1}{3}$ can be rewritten, in terms of the relation between the period T and the zero level period $\tau$, as the condition of $$0 < \frac{\tau}{T} < 0.25,$$

as illustrated in FIG. 6. If, accordingly, the voltage to be applied is a square-shaped pulse voltage having the zero level period between the positive and negative pulses, the positive and negative pulses can be modified within the range of satisfying said inequality. Further in detail, explanation is made as follows. In FIG. 5, +E represents the peak value of positive pulse, −E the peak value of negative pulse, and $\tau$ the zero level period.

The square-shaped pulse voltage *e(t)* illustrated in FIG. 5 can be expanded into the following Fourier series.

$$e(t) = \sum_{m=1}^{\infty} bm \sin m\,\omega t$$

where $$bm = \frac{2E}{\pi} \cdot \frac{1-(-1)^m}{m} \cdot \cos\frac{m\pi\tau}{T}.$$

The ratio $$\left|\frac{b3}{b1}\right|$$

of this pulse voltage *e(t)* is expressed as below.

$$\left|\frac{b3}{b1}\right| = \frac{1}{3} \cdot \frac{\cos\left(\frac{3\pi\tau}{T}\right)}{\cos\left(\frac{\pi\tau}{T}\right)}$$

The relation of $\tau/T$ with $b3/b1$ is illustrated in FIG. 6. As understood from FIG. 6, the range within which the ratio $$\left|\frac{b3}{b1}\right|$$

of the square-shaped pulse voltage illustrated in FIG. 5 is less than $\frac{1}{3}$ corresponds, in terms of $\tau/T$, to the range of $$0 < \frac{\tau}{T} < 0.25.$$

Further, when $$\frac{\tau}{T} = \frac{1}{6},$$

the third harmonics wave component has a zero value.

In the square-shaped pulse voltage illustrated in FIG. 5, the amplitude *b1* of its fundamental wave component decreases in accordance with a reduction in value of $\cos \pi\tau/T$ within the range of $$0 < \frac{\tau}{T} < 0.25.$$

Figure 7:
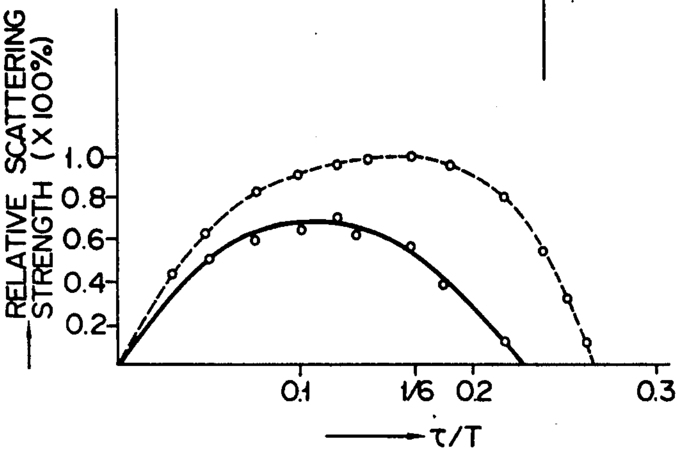
FIG. 7 is a curved diagram illustrating the light scattering strength characteristic of the liquid crystal relative to the ratio $\tau/T$ of the waveform illustrated in FIG. 5.

Accordingly, when the square-shaped pulse voltage E is constant, the maximum light scattering strength of the liquid crystal falls within the range of $$\frac{\tau}{T} < \frac{1}{6},$$

as indicated by a solid line in FIG. 7. The solid line-indicated characteristic of FIG. 7 is one obtained by applying to the liquid crystal such a square-shaped pulse voltage $$\left(\frac{1}{T} = 600\ \text{Hz},\ E = 30\ V\right)$$

as illustrated in FIG. 5.

Further, if, in case the value of $\tau/T$ is varied, voltage application is effected to the liquid crystal so as to cause the amplitude *bl* of the fundamental wave component to become constant, the light scattering strength of the liquid crystal will become maximum when the $\tau/T$ is 1/6, as indicated by a dotted line in FIG. 7. At this time, the amplitude *b*1 of the fundamental wave component is given as follows by substituting 1/6 for the $\tau/T$ of the equation:

$$bm = \frac{2E}{\pi} \cdot \frac{1-(-1)^m}{m} \cdot \cos\frac{m\pi\tau}{T}.$$

$$b1 = \frac{120}{\pi}\,(V)$$

Figure 8:
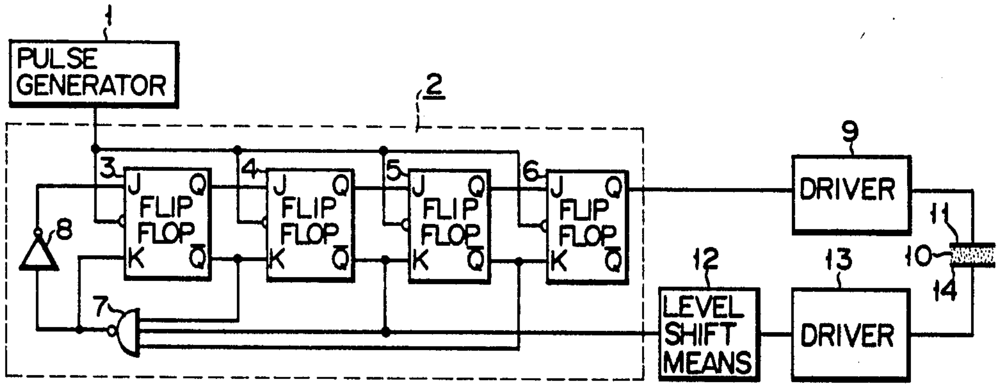
FIG. 8 is a block diagram illustrating an embodiment of a circuit construction for applying to the liquid crystal a voltage having a waveform illustrated in FIG. 5.

In FIG. 8 there is illustrated a circuit construction for applying to the liquid crystal such a square-shaped pulse voltage as illustrated in FIG. 5. In this circuit construction, the output terminal of the pulse generator 1 is connected to the input terminal of a ring counter 2. The ring counter 2 comprises flip-flop circuits 3, 4, 5 and 6, a NAND circuit 7, and an inverter 8. One output terminal of the ring counter 2 is connected to the input terminal of one driver 9. The output terminal of said one driver 9 is connected to one 11 of paired electrodes between which is provided a liquid crystal 10. The other output terminal of the ring counter 2 is connected to the input terminal of a level shift means 12. The output terminal of the level shift means 12 is connected to the input terminal of the other driver 13. The output terminal of said other driver 13 is connected to the other 14 of said paired electrodes.

Figure 9:
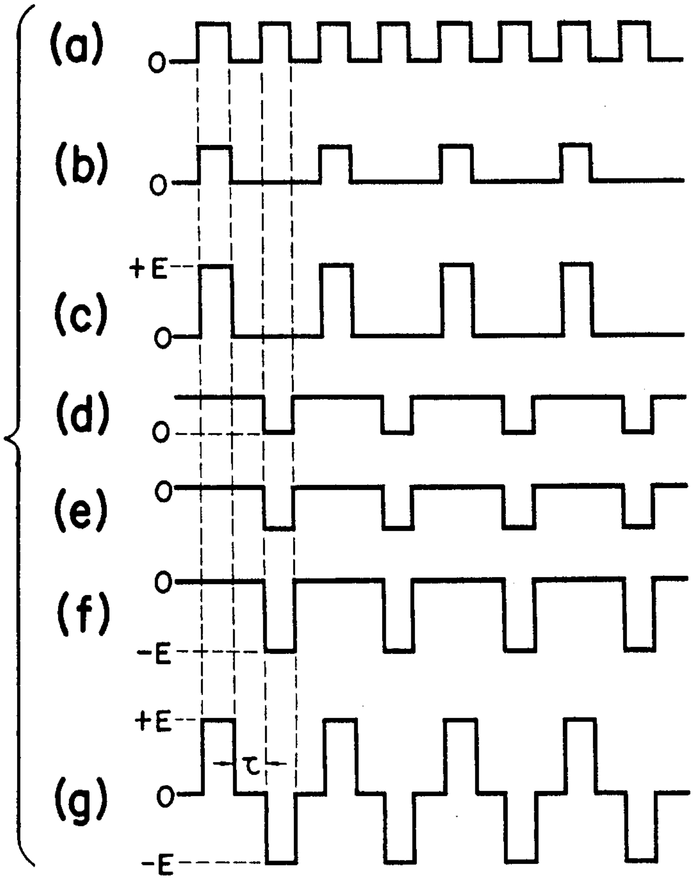
FIG. 9(a) to (g) are waveforms for explaining the operation of the circuit illustrated in FIG. 8.

There will now be described the operation of the circuit of FIG. 8 by reference to the waveforms illustrated in FIG. 9. The clock pulse illustrated in FIG. 9(a) which is generated from the pulse generator 1 is supplied to the respective input terminals of the flip-flop circuits 3, 4, 5 and 6 constituting the ring counter 2 having, for example, a 4-bit capacity, to drive the counter 2. Accordingly, such a pulse as illustrated in FIG. 9(b) is obtained at that output terminal of the fourth stage flip-flop circuit 6 which is used as said one output terminal of the counter 2. The pulse illustrated in FIG. 9(b) is fed to the driver 9, at the output terminal of which is obtained a pulse as amplified, as illustrated in FIG. 9(c) into a voltage (+E) whose magnitude is large enough to drive the liquid crystal. Such a pulse as illustrated in FIG. 9(d) is obtained at one output terminal $\overline{Q}$ of the second stage flip-flop circuit 4 used as said other output terminal of the counter 2. The pulse illustrated in FIG. 9(d) is delivered to the level shift means 12 and is shifted there in the negative direction to obtain such a pulse as illustrated in FIG 9(e) at its output terminal. The pulse illustrated in FIG. 9(e) is sent to said other driver 13 to obtain at its output terminal a pulse as amplified, as illustrated in FIG. 9(f), into a voltage of −E volt high enough to drive the liquid crystal. By applying the pulses illustrated in FIGS. 9(c) and (f) to said paired electrodes 11 and 14, respectively, such a pulse as illustrated in FIG. 9(g) is applied to the liquid crystal 10. Through varying the bit number of the ring counter 2 there can be adjusted the amplitude of the third harmonics wave component of the pulse voltage illustrated in FIG. 9(g). It is to be noted here that the operation of the circuit of FIG. 8 should be appreciated on the premise that the pulse generator 1, ring counter 2 and level shift means 12 are respectively supplied with voltages of $+V_{CC}$ and $-V_{EE}$; and the drivers 9 and 13 are supplied with a voltage of +E and a voltage of −E, respectively.

Figure 10:
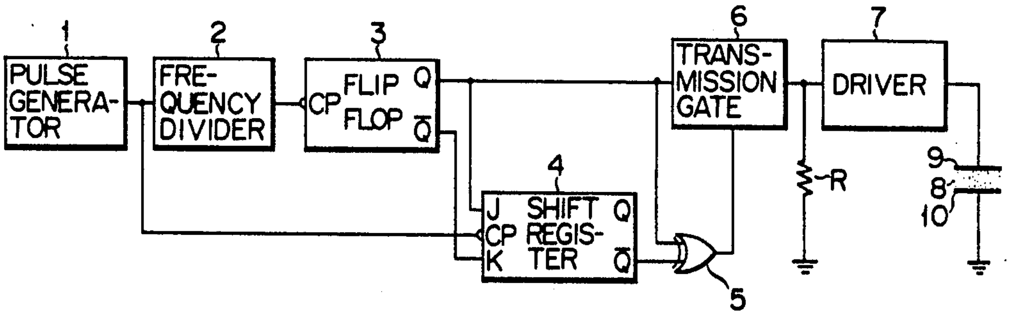
FIG. 10 is a block diagram illustrating another embodiment of said circuit construction for applying to the liquid crystal a voltage having the waveform illustrated in FIG. 5.

In FIG. 10 there is illustrated another circuit for applying such a square-shaped pulse voltage as illustrated in FIG. 5. In this circuit, the output terminal of a pulse generator 1 is connected to the input terminal of a frequency divider 2, the output terminal of which is connected to the CP input terminal of a flip-flop circuit 3. One output terminal Q of the flip-flop circuit 3 is connected to one input terminal J of the shift register 4, one input terminal of an exclusive OR gate 5, and one input terminal of a transmission gate 6 respectively. The other output terminal $\overline{Q}$ of the flip-flop circuit 3 is connected to the other input terminal K of the shift register 4.

The CP input terminal of the shift register 4 is connected to the output of the pulse generator 1. The output terminal $\overline{Q}$ of the shift register 4 is connected to the other input terminal of the exclusive OR gate 5. The output terminal of the exclusive OR gate 5 is connected to the other input terminal of the transmission gate 6. The output terminal of the transmission gate 6 is connected to the input terminal of a driver 7 and also to one end of a resistor R, the other end of which is grounded. The output terminal of the driver 7 is connected to one 9 of paired electrodes between which is provided a liquid crystal 8, the other 10 of said paired electrodes being grounded.

Figure 11:
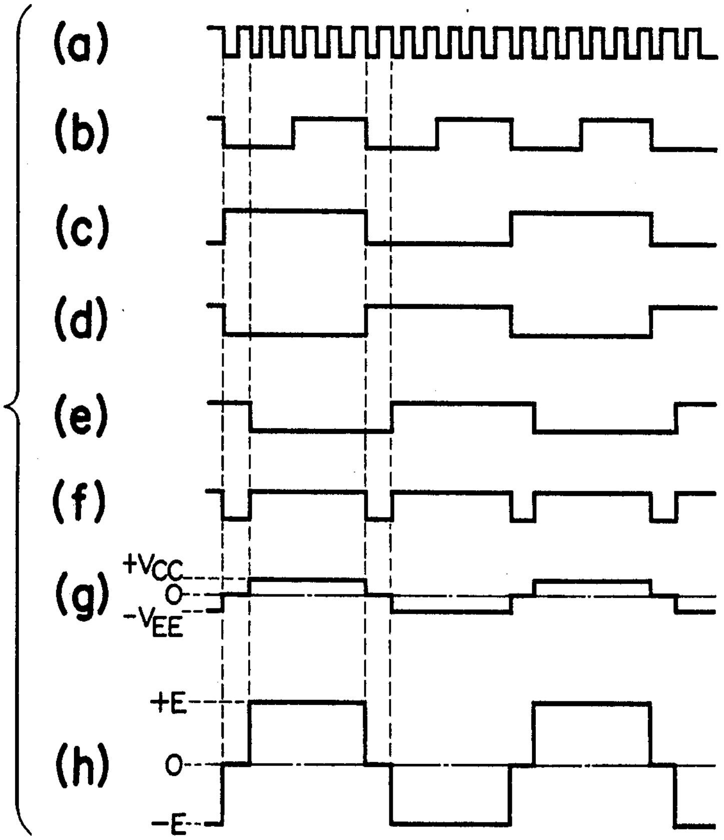
FIGS. 11(a) to (h) are waveforms for explaining the operation of the circuit illustrated in FIG. 10.

There will now be described the operation of this circuit by reference to the waveforms illustrated in FIG. 11.

Such a clock pulse as illustrated in FIG. 11(a) is generated at the output terminal of the pulse generator 1. The clock pulse is fed to the frequency divider 2. Said frequency divider 2 has a frequency dividing ratio of 1/6, for example. Thus, such a pulse as illustrated in FIG. 11(b) is obtained at the output terminal of the frequency divider 2. This pulse is supplied to the CP input terminal of the flip-flop circuit 3. The flip-flop circuit 3 is operated upon receipt of the pulse of FIG. 11(b) delivered from the frequency divider 2 to produce such a pulse as illustrated in FIG. 11(c) at its output terminal Q and simultaneously to produce such a pulse as illustrated in FIG. 11(d) at its output terminal $\overline{Q}$. The pulse illustrated in FIG. 11(c) is supplied to said one input terminal J of the shift register 4 having, for example, a 1-bit capacity, said one input terminal of the exclusive OR gate 5 and said one input terminal of the transmission gate 6, respectively. The pulse illustrated in FIG. 11(d) fed from the flip-flop circuit 3 is input to said other input terminal K of the shift register 4. The shift register 4 is previously supplied, at its CP input terminal, with said clock pulse from the pulse generator 1. Thus, the shift register 4 produces such a pulse as illustrated in FIG. 11(e) at its output terminal $\overline{Q}$. The pulse illustrated in FIG. 11(e) is delivered to said other input terminal of the exclusive OR gate 5 to obtain at the output terminal thereof such a pulse as illustrated in FIG. 11(f). This pulse is fed to said other input terminal of the transmission gate 6, and when the pulse of FIG. 11(c) supplied to said one input terminal is gated by the pulse of FIG. 11(f), there is obtained such a pulse as illustrated in FIG. 11(g) at both ends of the resistor R. The pulse illustrated in FIG. 11(g) is supplied to the driver 7 and is thereby amplified to a voltage (±E) whose magnitude is large enough to drive the liquid crystal 8. Such an amplified pulse as illustrated in FIG.

11(h) is obtained at the output terminal of the driver 7. This pulse is applied to said one 9 of the paired electrodes having the liquid crystal 8 provided therebetween.

In accordance with the foregoing operational principle there is applied to the liquid crystal 8 a square-shaped pulse voltage having a zero potential period between a positive pulse and the immediately succeeding negative pulse.

Note here that the foregoing operational principle should be appreciated on the premise that the pulse generator 1, frequency divider 2, flip-flop circuit 3, shift register 4, exclusive OR gate 5 and transmission gate 6 in the circuit construction of FIG. 10 are supplied respectively with voltages of $+V_{CC}$ and $-V_{EE}$; and the driver 7 is supplied with a voltage of $\pm E$.

Figure 12:
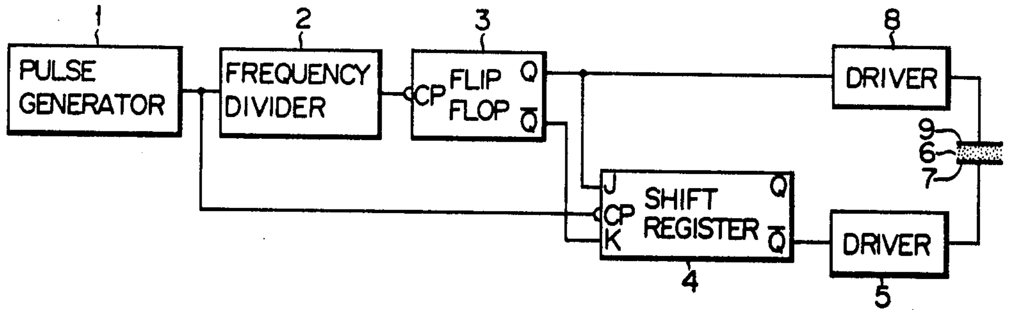
FIG. 12 is a block diagram illustrating another embodiment of said circuit construction for applying to the liquid crystal a voltage having the waveform illustrated in FIG. 5.

In FIG. 12 there is illustrated a similar circuit in the case where paired electrodes having a liquid crystal provided therebetween are not grounded.

In the circuit of FIG. 12, the output terminal of the pulse generator 1 is connected to the input terminal of a frequency divider 2. The output terminal of the frequency divider 2 is connected to the CP input terminal of a flip-flop circuit 3. One output terminal Q of the flip-flop circuit 3 is connected to one input terminal J of a shift register 4, while the other output terminal $\overline{Q}$ thereof is connected to the other input terminal K of the shift register 4. The CP input terminal of the shift register 4 is connected to the output terminal of the pulse generator 1. One output terminal Q of the shift register 4 is connected to the input terminal of one driver 5, the output terminal of which is connected to one 7 of the paired electrodes between which is provided the liquid crystal 6. Said one output terminal Q of the flip-flop circuit 3 is connected to the input terminal of the other driver 8, the output terminal of which is connected to the other 9 of said paired electrodes.

Figure 13:
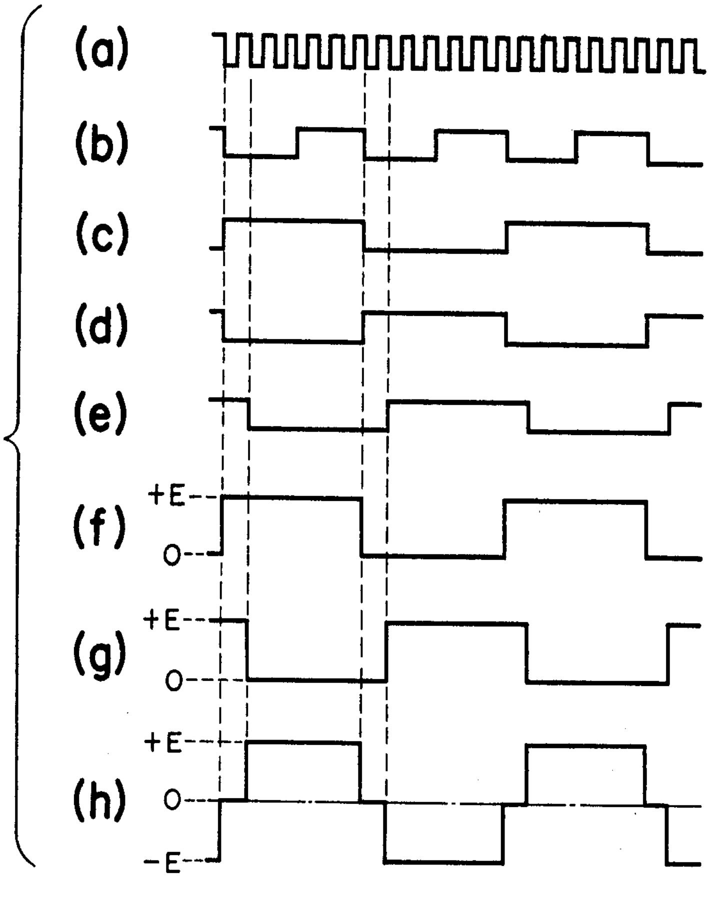
FIGS. 13(a) to (h) are waveforms for explaining the operation of the circuit illustrated in FIG. 12.

There will now be described the operational principle of this circuit by reference to the waveforms illustrated in FIG. 13.

Such a pulse as illustrated in FIG. 13(a) is generated at the output terminal of the pulse generator 1. The pulse is supplied to a frequency divider 2. Said frequency divider 2 has a frequency dividing ratio of 1/6, for example. Thus, such a pulse as illustrated in FIG. 13(b) is obtained at the output terminal of the frequency divider 2. This pulse is supplied to the CP input terminal of the flip-flop circuit 3, and such pulses as illustrated in FIG. 13(c) and FIG. 13(d) are simultaneously obtained at its one output terminal Q and at its other output terminal $\overline{Q}$, respectively. The pulses of FIGS. 13(c) and 13(d) are fed to a shift register, for example, to the input terminals J and K of that shift register 4 having, for example, a 1-bit capacity which is previously supplied as a clock pulse with the pulse from the pulse generator 1. Thus, such a pulse as illustrated in FIG. 13(e) is obtained at the output terminal of the shift register 4.

The pulse illustrated in FIG. 13(e) is supplied to said one driver 5 to obtain at its output terminal that pulse illustrated in FIG. 13(g) which has been amplified into a voltage E whose magnitude is large enough to drive the liquid crystal 6. The pulse illustrated in FIG. 13(c) is delivered to said other driver 8 to obtain at its output terminal that pulse illustrated in FIG. 13(f) which has been similarly amplified into said voltage E. When the pulses illustrated in FIGS. 13(g) and 13(f) are applied, respectively, to the paired electrodes 7 and 9 having the liquid crystal 6 provided therebetween there is applied to the liquid crystal 6 that square-shaped pulse voltage illustrated in FIG. 13(h) which has a zero potential period between a positive pulse and the immediately succeeding negative pulse.

Figure 14:
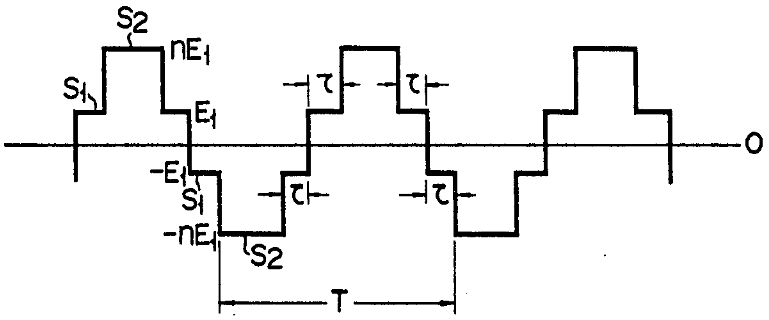
FIG. 14 is the waveform of another square-shaped pulse voltage suited to embody this invention.

In FIG. 14 there is illustrated another voltage waveform suitable as the square-shaped pulse voltage in which the absolute value of the ratio of the amplitude $b3$ of the third harmonics wave component to the amplitude $b1$ of the fundamental wave component is less than $\frac{1}{3}$. This voltage waveform is characterized in that it has no zero level period and its rising and falling portions are, respectively, in the form of stairs. It is now assumed that, in such a pulse voltage, E1 represents the amplitude ranging from a zero level indicated by a central line to a step S1 (−E1 represents the same amplitude taken in the negative direction); $n$E1 (=E2) represents the amplitude ranging from the zero level to a peak value S2 (−$n$E1 represents the same amplitude taken in the negative direction); and $\tau$ represents the period of the step S1. The period of the step S1 at the potentials ±E1 is hereinafter defined as "step period". Accordingly, the value ($nE1/E1$) obtained through dividing the amplitude $n$E1 (−$n$E1) from the zero level to the peak value S2 by the amplitude E1(−E1) from the zero level to the step S1 is $n$.

The pulse voltage $e(t)$ illustrated in FIG. 14 is expanded into the following Fourier series.

$$e(t) = \sum_{m=1}^{\infty} bm \sin m\omega t$$

$$\text{where } bm = \frac{2}{m\pi}\left(1 - \cos\frac{2m\tau\pi}{T} + n\cos\frac{2m\tau\pi}{T}\right)\{1-(-1)^m\}E.$$

The ratio of the amplitude $b3$ of the third harmonics were component to the amplitude $b1$ of the fundamental wave component contained in this pulse can be expressed as below.

$$\frac{1}{3}\;\frac{1-\cos\frac{6\tau\pi}{T}+n\cos\frac{6\tau\pi}{T}}{1-\cos\frac{2\tau\pi}{T}+n\cos\frac{2\tau\pi}{T}}$$

Figure 15:
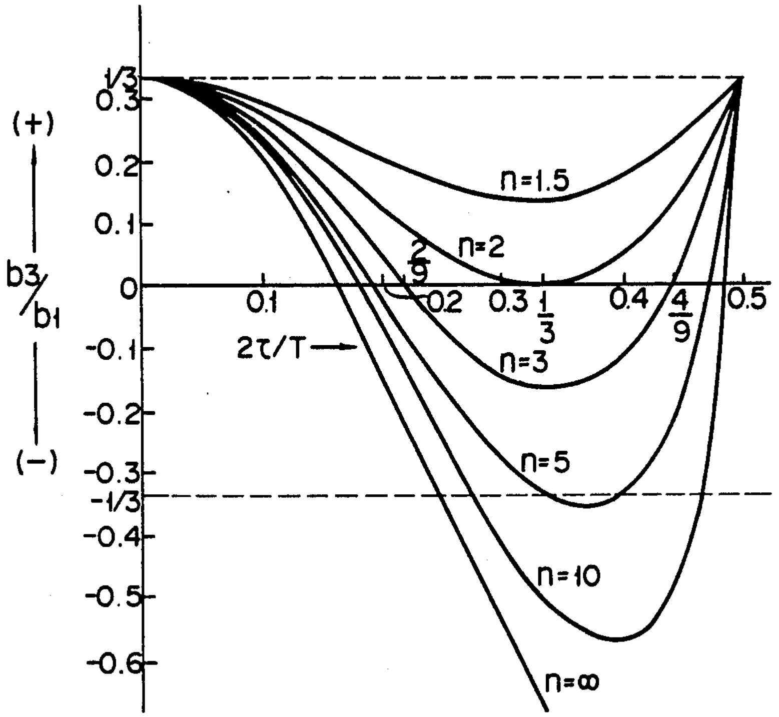
FIG. 15 is a characteristic curve diagram illustrating the relation between the ratios $2\tau/T$ and $b3/b1$ of the waveform illustrated in FIG. 14.

FIG. 15 illustrates the relation between $2\tau/T$ and $b3/b1$ in the case where, for example, $n$ = 1.5, 2, 3, 5, 10 and $\infty$. Although the amplitude b1 of the fundamental wave generally decreases as the $2\tau/T$ increases, the range of $2\tau/T$ in which the $b1$ presents a relatively small decrease and yet $$\left|\frac{b3}{b1}\right|$$

is less than $\frac{1}{3}$, namely the range of $2\tau/T$ in which the third harmonics wave component is reduced in amount is given below, as seen from FIG. 15.

$$0 < \frac{2\tau}{T} < 0.5$$

Accordingly, the voltage having such a waveform as illustrated in FIG. 14 has only to be applied which satisfies the following conditions.

$$\left| \frac{1 - \cos\left(\frac{6\tau\pi}{T}\right) + n\cos\left(\frac{6\tau\pi}{T}\right)}{1 - \cos\left(\frac{2\tau\pi}{T}\right) + n\cos\left(\frac{2\tau\pi}{T}\right)} \right| < 1 \text{ and}$$

$$0 < \frac{2\tau}{T} < 0.5$$

As understood from FIG. 15, where, for example, $n = 2$, the third harmonics wave component becomes zero at a point where $$\frac{2\tau}{T} = \frac{1}{3}.$$

Where $n = 3$, the third harmonics wave component becomes zero at points where the values of $2\tau/T$ are 2/9 and 4/9. Where n is not less than 2 (excluding $\infty$), there exist two points at which the third harmonics wave component becomes zero.

Figure 16:
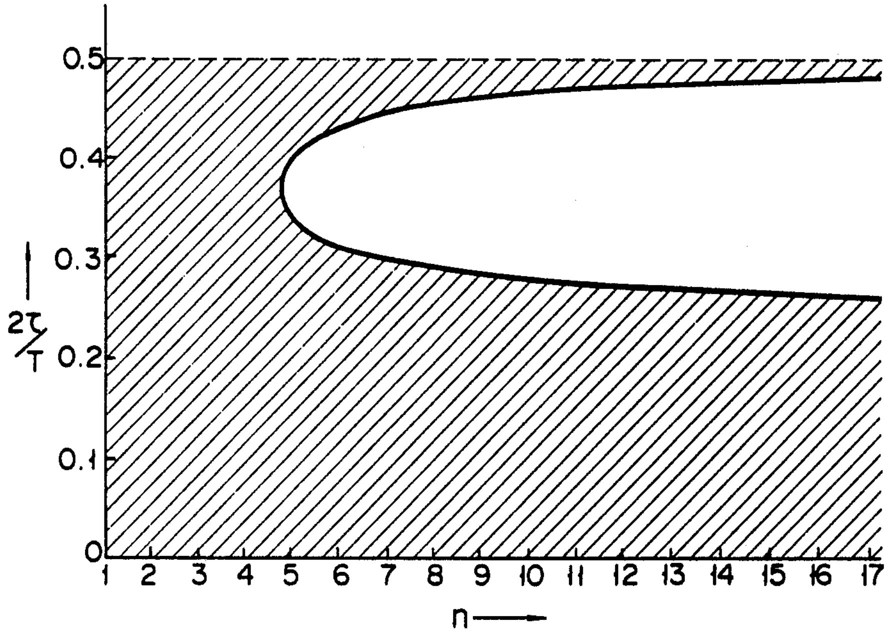
FIG. 16 is a characteristic curve diagram illustrating the relation between said ratio $2\tau/T$ and the ratio $E2/E1$ of the waveform illustrated in FIG. 14 where E2 and E1 represents the peak potential and the potential in the step period S1, respectively, of this waveform.

FIG. 16 illustrates the relation between $2\tau/T$ and $n$. In this graphic representation, the region indicated by oblique lines corresponds to the range in which said conditions are satisfied.

Figure 17:
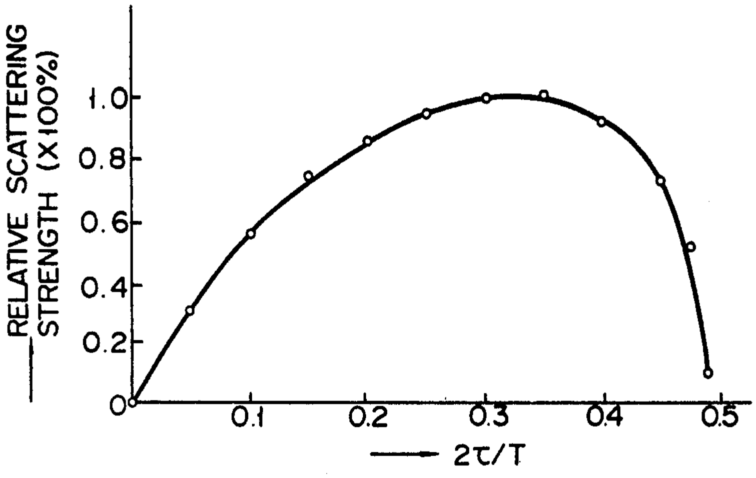
FIG. 17 is a curve diagram illustrating the light scattering strength characteristic of the liquid crystal relative to the ratio $2\tau/T$ of the waveform illustrated in FIG. 14, in the case where a voltage having this waveform is applied to the liquid crystal to drive the same.

In FIG. 17 there is illustrated the light scattering strength characteristic of the liquid crystal relative to $2\tau/T$. This characteristic is one obtained under the condition in which $n = 2$ and the repetitive frequency is 600 Hz.

Figure 18:
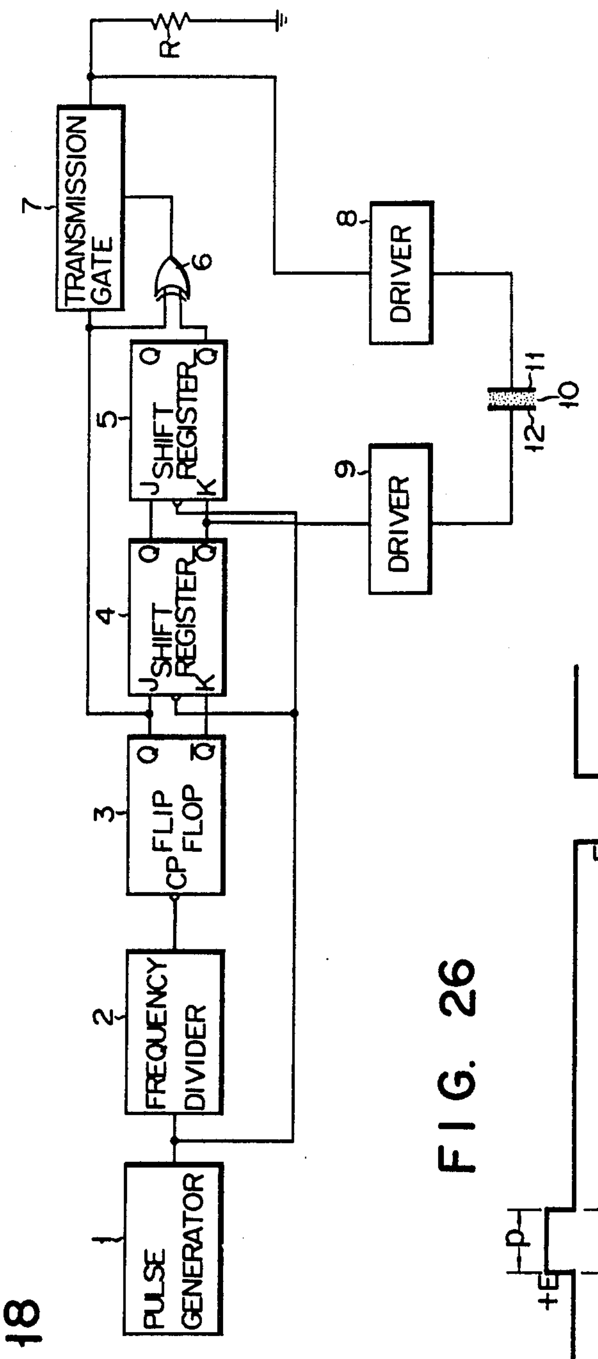
FIG. 18 is a block diagram illustrating an embodiment of a circuit construction for applying to the liquid crystal a voltage having the waveform illustrated in FIG. 14.

In FIG. 18 there is illustrated a drive circuit for applying to the liquid crystal the pulse illustrated in FIG. 14 whose rising and falling portions take, respectively, the forms of stairs.

Referring to FIG. 18, the output terminal of a pulse generator 1 is connected to the input terminal of a frequency divider 2. The output terminal of the frequency divider 2 is connected to the input terminal of a flip-flop circuit 3. One output terminal Q of the flip-flop circuit 3 is connected to the input terminal J of a first shift register 4, to one input terminal of an exclusive OR gate 6 and to one input terminal of a transmission gate 7, respectively. The output terminal of the transmission gate 7 is connected to one end of a resistor R the other end of which is grounded, and to the input terminal of a first driver 8. The other output terminal $\overline{Q}$ of the flip-flop circuit 3 is connected to the other input terminal K of the first shift register 4. One output terminal Q of the first shift register 4 is connected to one input terminal J of a second shift register 5. The other output terminal $\overline{Q}$ of the first shift register is connected to the other input terminal K of the second shift register 5, and to the input terminal of a second driver 9. The output terminal $\overline{Q}$ of the second shift register 5 is connected to the other input terminal of the exclusive OR gate 6, the output terminal of which is connected to the other input terminal of the transmission gate. The output terminal of the first driver 8 is connected to one 11 of paired electrodes having a liquid crystal 10 provided therebetween, while the output terminal of the second driver 9 is connected to the other 12 of said paired electrodes.

There will now be described the operational principle of this circuit by reference to the pulse waveforms illustrated in FIG. 19.

Figure 19:
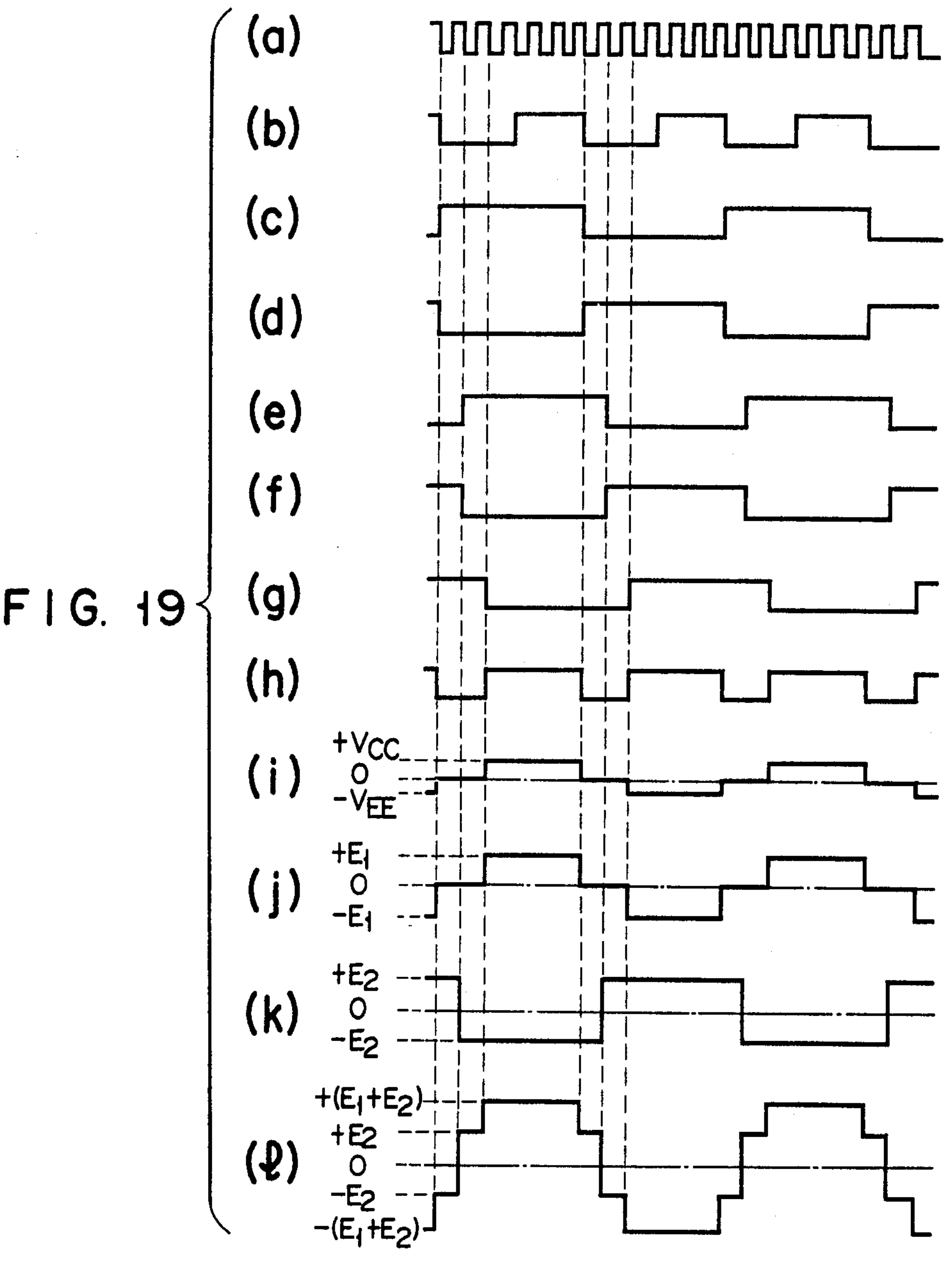
FIGS. 19(a) to (l) are waveforms for explaining the operation of the circuit illustrated in FIG. 18.

From the pulse generator 1 there is generated such a clock pulse as illustrated in FIG. 19(a). This clock pulse is delivered to the frequency divider 2. Said frequency divider 2 has a frequency dividing ratio of 1/6, for example. Thus, there is obtained such a pulse as illustrated in FIG. 19(b) at the output terminal of the frequency divider 2. This pulse is fed to the CP input terminal of the flip-flop circuit 3 to drive the flip-flop circuit 3. As a result, there is obtained at its output terminal Q such a pulse as illustrated in FIG. 19(c), while there is obtained at its output terminal $\overline{Q}$ such a pulse as illustrated in FIG. 19(d). The pulses illustrated in FIGS. 19(c) and 19(d) are supplied, respectively, to the input terminals J and K of the first shift register 4 having, for example, a 1-bit capacity which is previously supplied as a clock pulse with the pulse illustrated in FIG. 19(a). As a result, there is obtained at its output terminal Q such a pulse as illustrated in FIG. 19(e), while there is obtained at its output terminal $\overline{Q}$ such a pulse as illustrated in FIG. 19(f). The pulse illustrated in FIG. 19(c) appearing at the output terminal $\overline{Q}$ of the flip-flop circuit 3 is coupled also to said one input terminal of the exclusive OR gate 6 as well as to said one input terminal of the transmission gate 7. The pulse illustrated in FIG. 19(e) appearing at the output terminal $\overline{Q}$ of the shift register 4 and the pulse illustrated in FIG. 19(f) appearing at the output terminal Q thereof are supplied to that second shift register 5 having, for example, a 1-bit capacity which is previously supplied as a clock pulse with the pulse illustrated in FIG. 19(a). As a result, there is obtained at its output terminal Q such a pulse as illustrated in FIG. 19(g). The pulse illustrated in FIG. 19(g) appearing at the output terminal Q of the shift register 5 is fed to said other input terminal of the exclusive OR gate 6 to obtain at its output terminal such a pulse as illustrated in FIG. 19(h). The pulse illustrated in FIG. 19(h) is supplied to said other input terminal of the transmission gate 7 to obtain at its output terminal such a pulse as illustrated in FIG. 19(i). This pulse is supplied to the first driver 8 to obtain at its output terminal that pulse illustrated in FIG. 19(j) which has been amplified into a prescribed voltage level of ±E1. The pulse illustrated in FIG. 19(f) appearing at the output terminal Q of the shift register 4 is fed to the second driver 9 to obtain at its output terminal that pulse illustrated in FIG. 19(k) which has been amplified into a prescribed voltage level of ±E2. When the pulses illustrated in FIGS. 19(j) and 19(k) are applied, respectively, to said paired electrodes 11 and 12, there is applied to the liquid crystal 10 such a pulse as illustrated in FIG. 19(1).

In this case, any desired waveform can be obtained by varying the frequency dividing ratio of the frequency divider 2, the bit number $k$ of the shift registers 4 and 5 and the value of the voltages E1, E2. The foregoing circuit of FIG. 18 is operated by positive and negative sources, though they are not shown, and it is to be noted that the operation of said foregoing circuit should be appreciated on the premise that the pulse generator 1, frequency divider 2, flip-flop circuit 3, shift registers 4 and 5, exclusive OR gate 6, and transmission gate 7 are respectively supplied with voltages of $+V_{CC}$ and $-V_{EE}$; the driver 8 is supplied with a voltage of ±E1; and the driver 9 is supplied with a voltage of ±E2.

Figure 20:
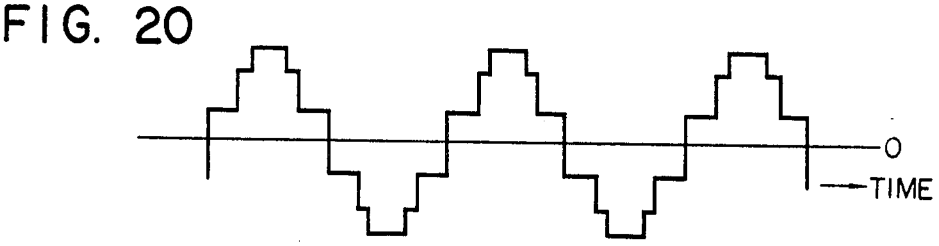
FIGS. 20 and 21 are waveforms respectively obtained by partially modifying the waveform illustrated in FIG. 14.
Figure 21:
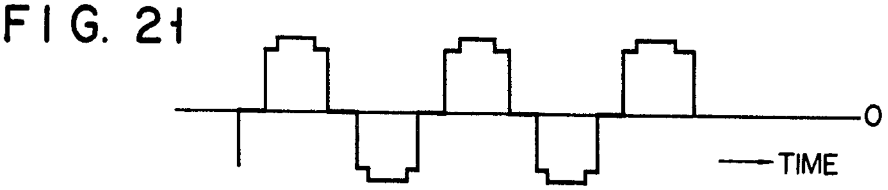

The preceding embodiments refer to the positive and negative pulses whose stairs-forms at their respective rising portions and falling portions each include a single step between the zero level and the peak level. But as illustrated in FIGS. 20 and 21 said stairs-forms may each include a plurality of steps. In this case, however, the foregoing range of $2\tau/T$ is varied as a matter of course.

Figure 22:
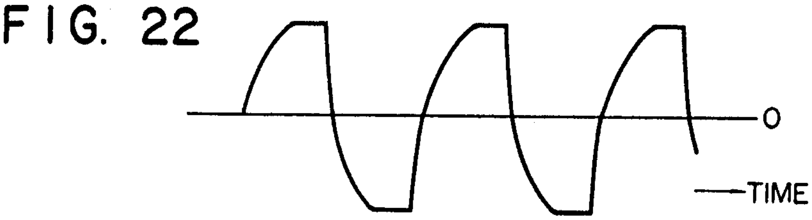
FIG. 22 is the waveform of another square-shaped pulse voltage suited to embody this invention.

In FIG. 22 there is illustrated another pulse waveform which is suitable as the square-shaped pulse voltage in which the value of $$\left|\frac{b3}{b1}\right|$$

is less than $\frac{1}{3}$. This pulse waveform is the one in which the value of $$\left|\frac{b3}{b1}\right|$$

is less than $\frac{1}{3}$ and yet the amplitude of, for example, the fifth, seventh, ninth harmonics wave components higher than the above-mentioned harmonics wave component is decreased. Such a voltage waveform as illustrated in FIG. 22 can be extremely easily obtained by passing the square wave illustrated in FIG. 1 through a low-pass filter.

Figure 23:
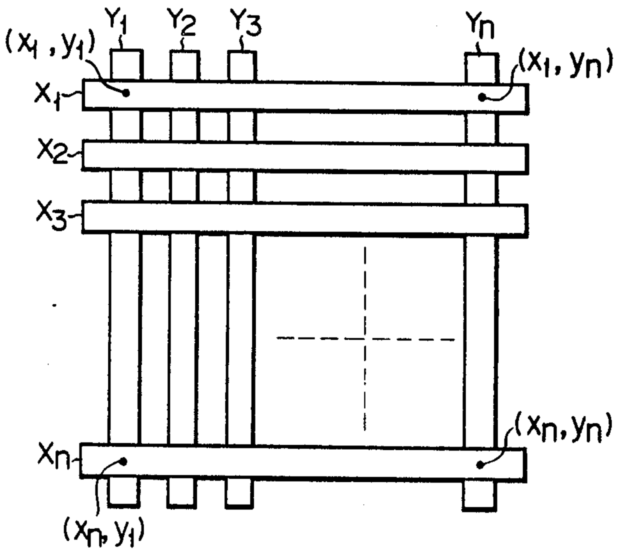
FIG. 23 schematically illustrates the construction of a matrix type liquid crystal device.
Figure 24:
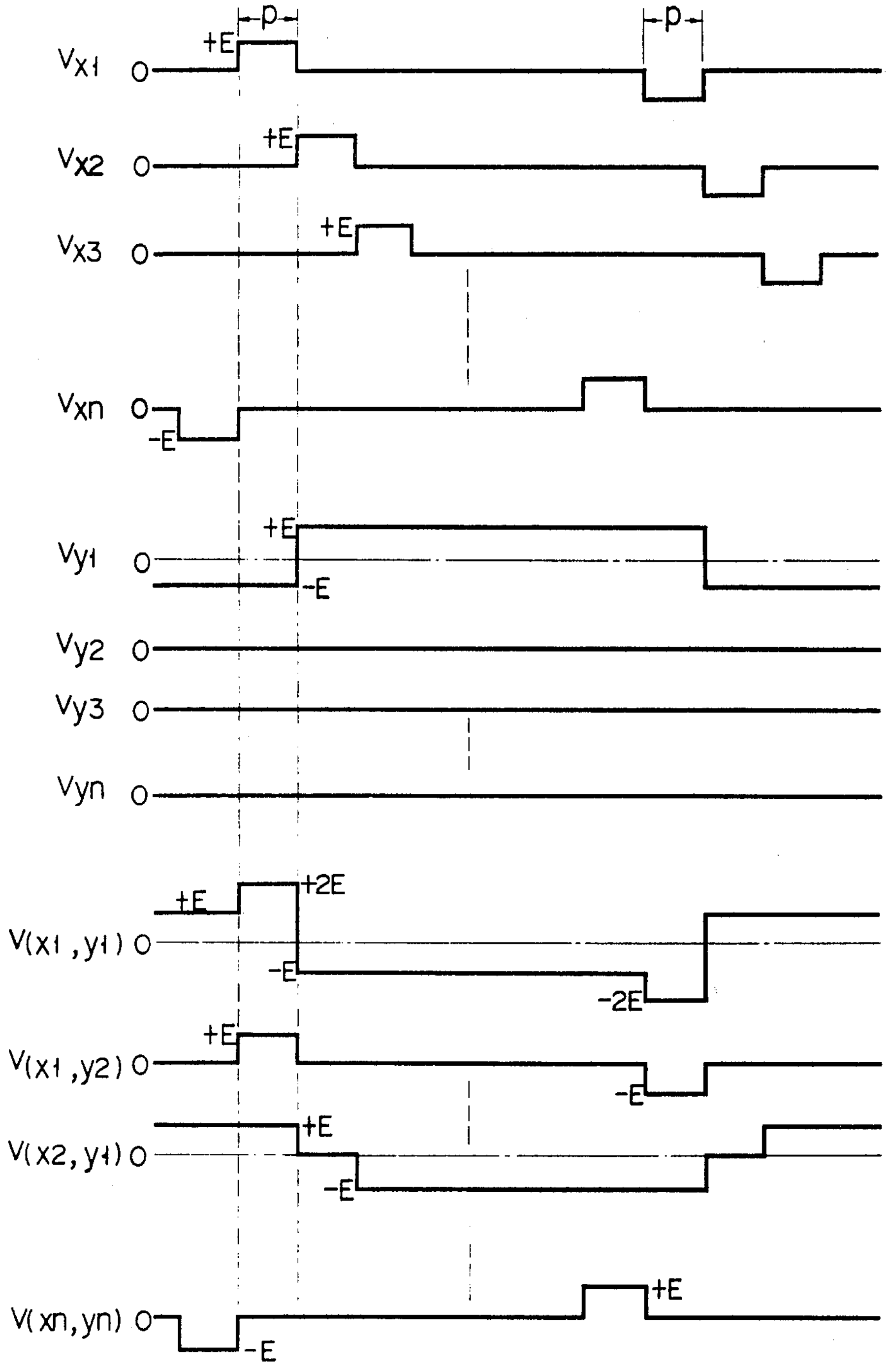
FIG. 24 is a waveform view for explaining the prior art time divisional driving system for the matrix type liquid crystal device illustrated in FIG. 23.

There will now be explained a matrix type liquid crystal device driving system by reference to FIG. 23. Into a transparent glass-made receptacle there is injected as a liquid crystal, for example, a nematic mixed liquid crystal comprising 4′-methoxy benzylidene-4-n-butyl aniline, 4′-ethoxy benzylidene-4-n-butyl aniline, or the like. On the inner wall surface of the transparent glass receptacle there are disposed, for example, tin oxide-made transparent electrodes in such a manner that a row electrodes X1, X2, X3 . . . Xn respectively intersect column electrodes Y1, Y2, Y3 . . . Yn at right angles thereto, as illustrated in FIG. 23. Hereinafter, explanation is made of the case where a matrix type liquid crystal device having the foregoing construction is subjected to time divisional driving by utilizing the "line scanning" system. The conventional time divisional driving is effected by applying the voltage waveforms Vx1, Vx2, Vx3, . . . . Vxn and the voltage waveforms Vy1, Vy2, Vy3, . . . Vyn illustrated in FIG. 24 to the row electrodes X1, X2, X3, . . . Xn and the column electrodes Y1, Y2, Y3, . . . Yn, respectively. In this case, accordingly, the voltage waveforms V(*x*1, *y*1), V(*x*1, *y*2), V(*x*2, *y*1), . . . V(xn, yn) illustrated in FIG. 24 are applied, respectively, to the liquid crystal portions at the intersections (x1, y1), (x1, y2), (x2, y1), . . . (xn, yn) of the row electrodes and the column electrodes. In each of these voltage waveforms, a voltage of ±E applied to the row and column electrodes is chosen to having a level lower than a threshold voltage causing the liquid crystal to start to present a light scattering phenomenon. Accordingly, the liquid crystal portions at the intersections (x1, y2), (x2, y1), . . . . (xn, yn) placed under a non-scanned condition do not exhibit a dynamic scattering state and only the liquid crystal portion at the intersection (x1, y1) placed under a scanned condition is applied with a voltage having a level +2E or −2E whose absolute value is greater, during the period P of the voltage V(x1, y1), than the threshold voltage, to present a whitish dynamic scattering state. By controlling with the lapse of time the application of a voltage to the row electrodes, the liquid crystal can be driven by the time divisional driving system. However, where liquid crystal driving is performed by applying to the liquid crystal such a square wave pulse voltage as illustrated in FIG. 24, there results the previously mentioned drawback that where the ambient temperature is decreased or where the frequency of the square-shaped pulse voltage is increased, the liquid crystal is made inoperative because said square wave pulse voltage contains a considerable amount of harmonics wave component such as the third harmonics wave component, as well as the fundamental wave component. This drawback can be removed by using as a square-shaped synthesized voltage in which the value of $$\left|\frac{b3}{b1}\right|$$

is less than $\frac{1}{3}$, for example, a voltage having a zero potential period when changing-over is effected from a non-selective pulse to a selective pulse, or vice versa.

Figure 25:
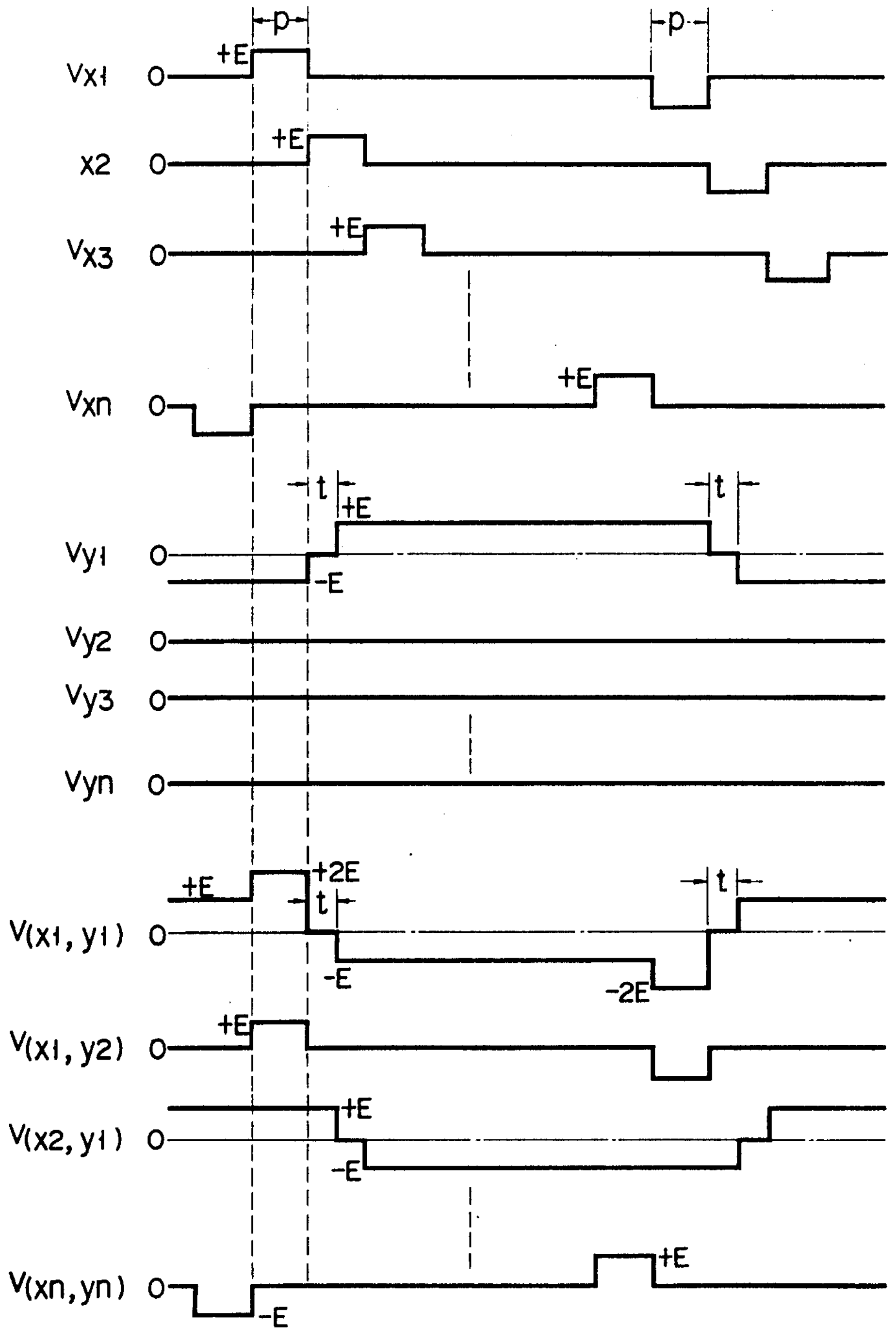
FIG. 25 is a waveform view for explaining an embodiment of the present time divisional driving system for the matrix type liquid crystal device illustrated in FIG. 23.

An example of such square-shaped pulse voltage waveform is illustrated in FIG. 25. Hereinafter, explanation is made of the case where this square-shaped pulse voltage waveform is applied to the matrix type liquid crystal device illustrated in FIG. 23 to drive the same. The square-shaped pulse voltage waveform illustrated in FIG. 25 is the one used where the liquid crystal portion at the intersection (x1, y1) is driven as in the case of the square pulse voltage waveform illustrated in FIG. 24. The voltage waveforms Vx1, Vx2, Vx3, . . . Vxn and the voltage waveforms Vy1, Vy2, Vy3, . . . . Vyn illustrated in FIG. 25 are applied, respectively, to the row electrodes X1, X2, X3, . . . Xn and the column electrodes Y1, Y2, Y3, . . . Yn illustrated in FIG. 23. Accordingly, the voltage waveforms V(x1, Y1), V(x1, y2), V(x2, y2), . . . V(xn, yn) illustrated in FIG. 25 are applied, respectively, to the intersections (x1, y1), (x1, y2), (x2, y1) . . . (xn, yn) illustrated in FIG. 23. The pulse voltages ±E applied to the row electrodes X1, X2, X3, . . . Xn and the column electrodes Y1, Y2, Y3, . . . Yn are chosen to have a level lower than the threshold voltage of the liquid crystal. As in the case of FIG. 24, therefore, the liquid crystal portions at the intersections (x1, y1), x1, y2), (y2, x1), . . . (xn, yn) do not go so far as to exhibit a dynamic scattering state and only the liquid crystal portion at the intersection (x1, y1) is applied with a voltage having a level +2E or −2E whose absolute value is greater, during the period P, than the threshold voltage, thus to present a dynamic scattering state. In this manner, by applying to the liquid crystal a voltage waveform having a zero potential level period t when shifting is effected from a selected state to a non-selected state or vice versa, the repetitive frequency of the square-shaped pulse can be increased to enable a liquid crystal device having a large number of elements to be driven.

Figure 26:
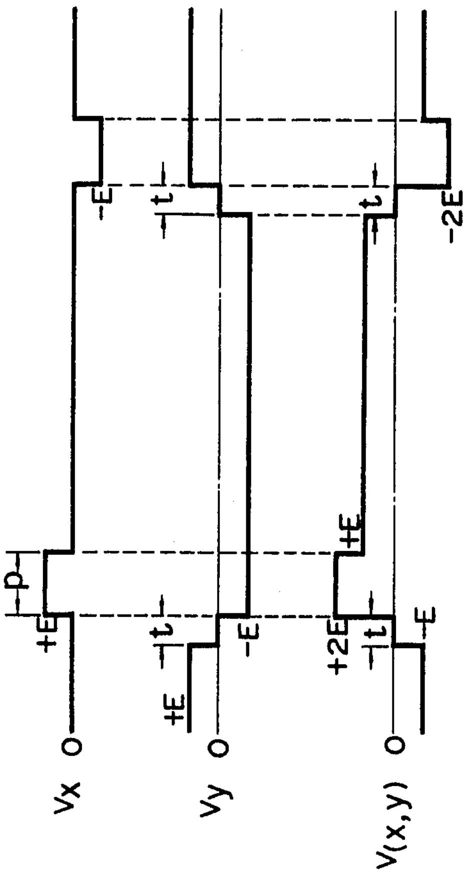
FIG. 26 is a waveform view for explaining another embodiment of the present time divisional driving system for the matrix type liquid crystal device illustrated in FIG. 23.

Said embodiment of FIG. 25 refers to the case where use is made of the square-shaped pulse voltage having a zero potential level period when shifting is effected from a selected state to a non-selected state. However, the same reference applies also to the case where use is made of a square-shaped pulse voltage having a zero level *t* when, conversely, shifting is effected from a non-selected state to a selected state. FIG. 26 is for the purpose of explaining this latter case, and illustrates the relation between the voltage Vx being applied to the row electrodes, the voltage Vy being applied to the column electrodes and the voltages V(*x*, *y*) being applied to the liquid crystal portion at the intersection (*x*, *y*). Namely, the voltage Vy for the column electrode Y is made to have a zero potential level period t when shifting is effected from +E to −E or vice versa, and in corresponding relation to the voltage Vy the voltage V(*x*, *y*) for said liquid crystal portion is made to have zero potential level period t when shifting is effected from $-E$ to $+2E$ or from $+E$ to $-2E$. It is to be noted that this invention can be similarly applied also to the case where the row electrodes are different in number from the column electrodes.

As above described, this invention permits the liquid crystal to be driven up to a lower ambient temperature and up to a higher frequency through applying to the liquid crystal a square-shaped pulse voltage in which the ratio of the amplitude b3 of the third harmonics wave component to the amplitude b1 of the fundamental wave component is reduced below $\frac{1}{3}$.

What is claimed is:

1. A liquid crystal device comprising a liquid crystal cell having at least one first and at least one second electrode disposed therein in a manner spaced from each other and a liquid crystal provided between said first and second electrodes, and means connected across said electrodes for generating a voltage pulse with a composite square wave comprising a train of square wave pulses, the train having a third harmonic wave component and in which the absolute value of the ratio $b3/b1$ where $b3$ represents the amplitude of the third harmonic wave component and b1 represents the amplitude of the fundamental wave component is less than $\frac{1}{3}$.

2. A liquid crystal device according to claim 1 wherein said voltage pulse has a zero potential period between a positive pulse and an immediately succeeding negative pulse and satisfies the condition of $$0 < \frac{\tau}{T} < 0.25$$

where T represents the cyclical period of said voltage pulse and $\tau$ represents said zero potential period.

3. A liquid crystal device according to claim 2 wherein said voltage pulse has rising and falling waveform portions which respectively have a single step period $\tau$ and which satisfies the conditions:

$$\left| \frac{1 - \cos\left(\frac{6\tau\pi}{T}\right) + n\cos\left(\frac{6\tau\pi}{T}\right)}{1 - \cos\left(\frac{2\tau\pi}{T}\right) + n\cos\left(\frac{2\tau\pi}{T}\right)} \right| < 1 \text{ and}$$

$$0 < \frac{2\tau}{T} < 0.5$$

where T represents the cyclical period of said voltage pulse and $\tau$ represents said step period.

4. A liquid crystal device according to claim 1 wherein said voltage pulse has rising and falling characteristics which are rendered dull due to the reduction in amplitude of the harmonics wave components which are higher than said third harmonics wave component as well as of said third harmonics wave component.

5. A liquid crystal device according to claim 1, wherein said first electrode is constituted by a plurality of row electrodes, said second electrode is constituted by a plurality of column electrodes, and said voltage pulse has a zero potential period when a selective pulse for bringing said liquid crystal to a driven state is shifted to a non-selective pulse for bringing said liquid crystal to a non-driven state.

6. A liquid crystal device according to claim 1, wherein said first electrode is constituted by a plurality of row electrodes, said second electrode is constituted by a plurality of column electrodes, and said voltage pulse has a zero potential period when a non-selective pulse for bringing said liquid cyrstal to a non-driven state is shifted to a selective pulse for bringing said liquid crystal to a driven state.

* * * * *